United States Patent

Holan

[15] 3,690,356
[45] Sept. 12, 1972

[54] CUTTER ASSEMBLY FOR A WOODWORKING MACHINE

[72] Inventor: Leif A. Holan, Winona, Minn. 55987

[73] Assignee: Lief A. Holan, William Wernz and Rudolph Miesbauer, stockholders of Winona Industries, Inc., Winona, Minn.

[22] Filed: June 5, 1970

[21] Appl. No.: 43,673

[52] U.S. Cl. .............. 144/136 R, 83/666, 143/38 R, 143/155 R
[51] Int. Cl. ........................... B27b 5/20, B27b 5/32
[58] Field of Search....... 143/38, 40, 155 R; 144/136, 144/203, 204; 83/666

[56] References Cited

UNITED STATES PATENTS

| 46,325 | 2/1865 | Barnard | 143/155 R |
|---|---|---|---|
| 2,609,848 | 9/1952 | Schneider | 143/38 R |
| 3,125,139 | 3/1964 | Weinzierl | 143/40 |
| 1,706,206 | 3/1929 | Alwill | 143/155 R UX |

FOREIGN PATENTS OR APPLICATIONS

| 124,636 | 7/1947 | Australia | 143/38 |
| 41,763 | 12/1916 | Sweden | 144/136 |

*Primary Examiner*—Andrew R. Juhasz
*Assistant Examiner*—James F. Coan
*Attorney*—Merchant & Gould

[57] ABSTRACT

A woodworking machine for cutting a plurality of oriented V-grooves in a wood panel to effect simple cabinet fabrication. The grooves are formed by a cutting assembly having a pair of rotary cutters disposed at 45° with respect to the table and at 90° with respect to each other. The cutters have intermeshed teeth and are synchronously driven by a single electric motor through a gear transmission. The cutter assembly is carried on a track supported by an overhead frame and is arranged to pass over the wooden panel in cutting relation, which rests on a horizontal table. The machine includes means for lowering the cutting assembly to a desired position above the table and advancing the assembly with respect to the panel to form the groove. The cutting assembly is then elevated to a non-cutting position and returned to its initial position.

8 Claims, 4 Drawing Figures

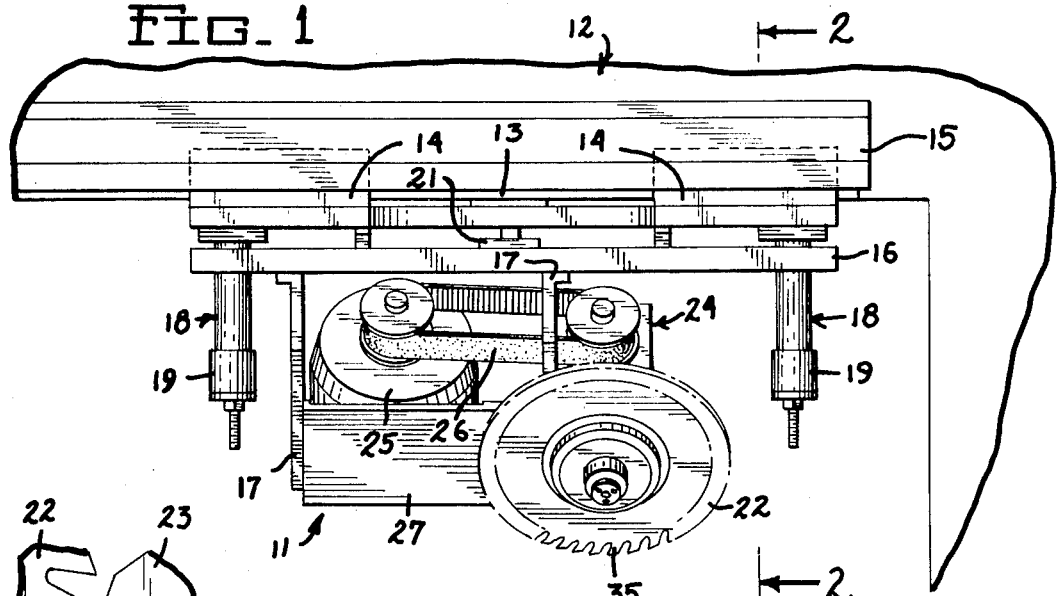
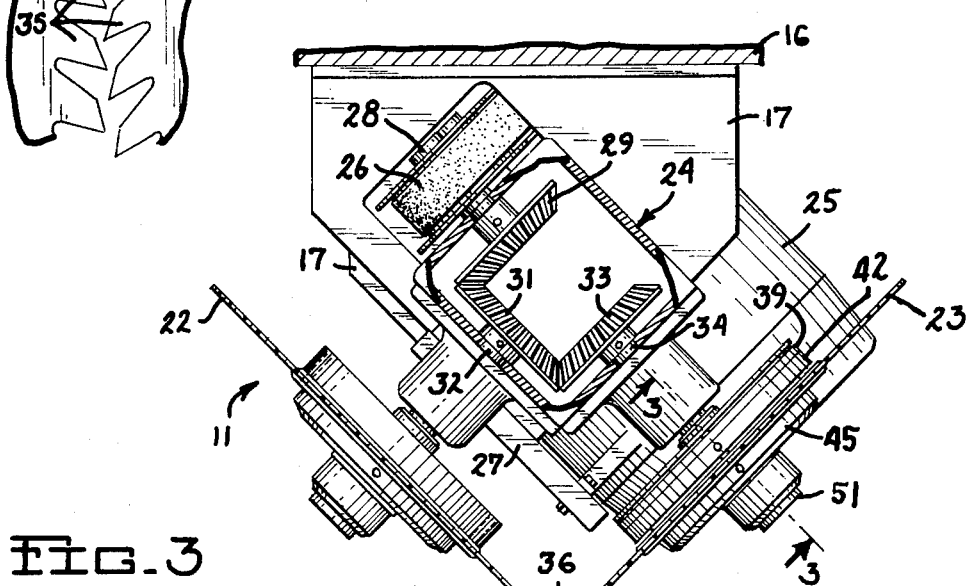
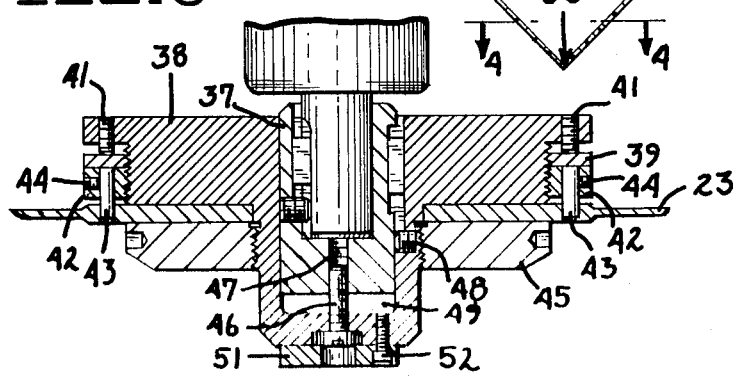
INVENTOR.
LEIF A. HOLAN
BY MERCHANT & GOULD
ATTORNEYS

CUTTER ASSEMBLY FOR A WOODWORKING MACHINE

The invention falls generally in the field of woodworking machines and is specifically directed to machines for the manufacture of cabinets from a single panel.

My copending application "WOODWORKING MACHINE," Ser. No. 823,370, filed May 9, 1969, and now U.S. Pat. No. 3,625,269, broadly discloses a wood grooving machine that facilitates the quick assembly of cabinets and the like. That application specifically discloses a machine which simultaneously forms a plurality of grooves in a panel by causing the panel to be advanced with respect to a plurality of novel groove-cutting heads.

Another copending application, also entitled "WOODWORKING MACHINE," Ser. No. 861,001, filed Sept. 25, 1969, discloses a wood grooving machine having a similar cutting assembly. However, the cutting assembly is slidably mounted on an overhead track, and after being lowered to a cutting position is advanced through the stationary wood panel to form the groove. After the cutting assembly has been elevated and returned to its initial position, the panel is advanced and reoriented by a plurality of programmed stops for formation of another groove. The cutting and reorienting process continues until the panel is fully grooved.

The woodworking machines disclosed in both the aforementioned applications greatly facilitate cabinet fabrication through rapid formation of V-grooves. Both machines employ groove cutting assemblies having a pair of rotary cutters which are preferably disposed at 45° with respect to the panel and at 90° with respect to each other. Previously, it has been necessary to position the rotary cutters one in front of the other since the lowermost line of cutting was common to both blades. This structure has achieved satisfactory results in formation of V-grooves in most materials, but the juxtaposition of rotary cutting blades has resulted in a cutting assembly that is far from compact. This space problem has been increased somewhat by the use of a separate motor for each cutting blade, which was found to be less difficult than attempting to drive both cutters with a single motor.

Further, it is evident with respect to overhead track machines that positioning the cutter blades one in front of the other requires additional track length to insure that the trailing blade has adequate space to complete its cut. I have also found that there is a tendency toward blade deflection in some materials, which is caused by one edge of the trailing blade extending into the kerf of the leading blade while the opposite cutting edge passes through uncut stock. This gives rise to a difference in resistance to each edge of the cutting element and results in deflection toward the path of lesser resistance.

This invention solves those problems through provision of a cutting assembly in which the rotary cutters are mounted side by side with their axes of rotation lying in the same plane. The teeth of the respective cutting blades intermesh in a common cutting region, and the blades themselves are driven synchronously by a single electric motor through a gear transmission. The resulting structure is far more compact and eliminates the need of a second electric motor and the lengthier track. Further, since the individual blades simultaneously cut the material at the same point, there is less tendency of the blades to deflect during the cutting operation. I have also found that the inventive structure is capable of making a cleaner cut in materials such as plastic.

BRIEF DESCRIPTION OF THE DRAWINGS

FIG. 1 is a side elevation of a cutting head incorporating the inventive principles;

FIG. 2 is a front elevation of the cutting assembly, parts thereof being broken away;

FIG. 3 is an enlarged sectional view of structural means for effecting rotational and axial adjustment of one of the rotary cutting blades, taken generally along the line 3—3 of FIG. 2; and FIG. 4 is a fragmentary plan view as seen from the line 4—4 of FIG. 2, on an enlarged scale.

DESCRIPTION OF THE PREFERRED EMBODIMENT

Referring initially to FIG. 1, a cutting assembly for a woodworking machine is shown generally at 11. In the preferred embodiment, cutting assembly 11 is carried on an overhead member 12 of the woodworking machine and rides on a horizontal track 13 by carriage members 14. The details of track 13 and carriage members 14 are shown in further detail in the second-named copending application above, and form no part of the instant invention. A cover 15 affixed to the side of overhead member 12 prevents sawdust, dirt and other matter from accumulating on track 13 and preventing smooth sliding movement of cutting assembly 11.

Cutting assembly 11 has a frame made up of a horizontal plate 16 and a pair of vertical members 17 attached thereto. Plate 16 is arranged for vertical sliding movement on a plurality of guide members 18 which are affixed to carriage members 14 and include lower adjustable limit stops 19. Vertical movement of cutting assembly 11 is brought about by a hydraulic piston-cylinder housed within overhead member 12 (not shown) and connected to horizontal plate 16 as shown at 21. Sliding movement of cutting assembly 11 is effected by a chain drive, not shown, also carried in overhead member 12.

Referring to FIG. 2, cutting assembly 11 includes a pair of cutting blades 22, 23 which are rotated by a gear transmission 24 affixed to one of the vertical members 17. Transmission 24 is in turn driven by an electric motor 25 and drive belt 26, motor 25 being mounted on a support plate 27 carried by vertical member 17.

As best seen in FIG. 2, transmission 24 has an input shaft 28 (rotated by belt 26) upon which is mounted a first bevel gear 29. Gear 29 meshes with a second bevel gear 31 which is mounted on a first output shaft 32, and gear 31 is in turn meshed with a third bevel bear 33 which is mounted on a second output shaft 34.

Cutting blades 22 and 23 are rotatably mounted on output shafts 32 and 34, respectively, as will be described in further detail below. As shown in FIG. 2, blades 22 and 23 are disposed at 90° with respect to each other in order to form a V-groove which enables a wood panel to be folded into a properly mitred corner joint.

The axes of rotation of blades 22 and 23 lie essentially in the same plane, and the blade diameters are chosen such that cutting teeth 35 of the blades will intermesh, as at region 36. Obviously, teeth 35 of blades 22 and 23 must intermesh without overlap in order to cut a proper groove, and it is also apparent that the teeth of one blade cannot engage those of the other blade.

To insure a proper juxtaposition of blades 22 and 23 with proper intermeshing of teeth 35 at region 36, blade 23 is adjustable both axially and rotationally. FIG. 3 shows the structure by which blade 23 is mounted on output shaft 34 and the structure which permits the axial and rotational adjustment. This structure includes an adapting hub 37 which is keyed onto output shaft 34, and an arbor 38 keyed on hub 37 and having a reduced threaded hub portion 40. A backup ring 39 is threaded on arbor 38 and held in a predetermined rotational position by set screws 41. A radial locating ring 42 is also screwed on arbor 38 and includes a pair of openings for transverse dowels 43. The position of radial locating ring 42 can thus be established and maintained by moving it into abutting engagement with backup ring 39 and setting the position of dowels 43 by set srews 44.

Blade 23 includes a pair of openings which are sized and spaced to receive dowels 43 upon placement over arbor 38. The rotational position of blade 23 is then fixed by a locking collar 45 threadedly engaged on reduced hub portion 40 of arbor 38, the threads of which are arranged in a manner opposite to those of backup ring 39 and radial locating ring 42.

Thus, it is evident that blade 23 can be rotationally adjusted for a proper mesh with blade 22 by loosening locking collar 45, adjusting blade 23 to the proper position (which carries dowels 43 and locating ring 42 with it) and turning up backup ring 39 until it abuts locating ring 42 as shown. Set screws 41 should then be screwed into abut backup ring 39 and prevent it from backing off. Locking collar 45 is then drawn up tight against blade 23 through the use of spanner wrenches on collar 45 and locating ring 42.

Axial adjustment of blade 23 is effected by an adjustment screw 46 which extends through an axial opening in the hub portion 40 of arbor 38 and screws into a threaded opening 47 in adapting hub 37. As FIG. 3 shows, arbor 38 is axially slidable on hub 37 and is held in place by a set screw 48. Hub 37 and arbor 38 are axially spaced, as at 49, to permit either inward or outward adjustment of arbor 39 and blade 23.

The under surface of the head of adjustment screw 46 engages a countersunk recess in the hub portion of arbor 38 while its top surface engages a retaining ring 51 affixed to arbor 38 by a plurality of screws 52. Thus, with turning of adjustment screw 46 in either direction, arbor 38 is slidably moved on hub 37 to obtain the proper axial position of blade 23 with respect to blade 22. Upon obtaining this proper position, set srew 48 48 is turned in tightly to maintain the position. Since set screw 48 lies under locking collar 45, it is obvious that axial adjustment must precede rotational adjustment of blade 23, and that locking collar 45 must be removed during that operation.

With blade 23 properly adjusted both axially and rotationally, blades 22 and 23 should intermesh as shown at region 36 so that neither blade overlaps the other and none of the teeth of one blade engage the teeth of the other. Hence, blades 22 and 23 intersect at a common point, and upon relative movement of a wood panel with respect to cutting assembly 11 a properly oriented 90° V-groove is formed which permits shaping of the panel into a perfectly mitred corner.

What is claimed is:

1. In a woodworking machine for forming grooves in a panel having edges and planar surfaces, the machine including a frame and means for supporting the panel in a operating plane, the improvement comprising:
    a. a groove-forming cutter assembly carried by the frame means and comprising first and second rotary cutting elements each having a plurality of cutting teeth;
    b. the elements respectively mounted on first and second rotating shaft means having axes lying in essentially the same plane, the first and second shaft means being constructed and arranged so that the elements lie in planes disposed at predetermined angles relative to the operating plane and to each other;
    c. power means for synchronously rotating the cutting elements;
    d. and means for adjusting the axial and rotational position of one of said cutting elements comprising
        1. arbor means slidably mounted for axial movement on one of said first and second shaft means and lockable in a predetermined axial position;
        2. and rotational adjusting means threadably rotatable on the arbor means, the rotational adjusting means constructed and arranged to engageably receive and rotationally carry the associated cutting element relative to the arbor means, and including means for locking the cutting element in a predetermined rotational position.

2. In a woodworking machine for forming grooves in a panel having edges and planar surfaces, the machine including a frame and means for supporting the panel in an operating plane, the improvement comprising:
    a. a groove-forming cutter assembly carried by the frame means and comprising first and second rotary elements each having a plurality of cutting teeth;
    b. the elements respectively mounted on first and second rotating shaft means having axes lying in essentially the same plane, the first and second shaft means being constructed and arranged so that the elements lie in planes disposed at predetermined angles relative to the operating plane and to each other;
    c. means for adjusting the axial position of one of the first and second cutting elements along its axis of rotation, comprising;
        1. an arbor slidably mounted for axial movement on one of the first and second rotating shaft means and constructed to receive said one cutting element;
        2. a threaded adjusting screw having a head portion retained by and freely rotatable with respect to the arbor, the threaded adjusting screw constructed and arranged for axial, threaded engagement with said one rotating shaft means whereby rotation thereof will effect axial movement of the arbor with respect to said one rotating shaft means;

3. and releasable retaining means for preventing axial movement of the arbor on said one rotating shaft means.

3. The apparatus defined by claim 2, wherein:
a. the threaded adjusting screw is disposed on the rotational axis of said one rotating shaft means and extends through the arbor, the screw head portion being countersunk in the arbor;
b. and further comprising a screw retaining ring affixed to the arbor and overlying the screw head.

4. In a woodworking machine for forming grooves in a panel having edges and planar surfaces, the machine including a frame and means for supporting the panel in an operating plane, the improvement comprising:
a. a groove-forming cutter assembly carried by the frame means and comprising first and second rotary elements each having a plurality of cutting teeth;
b. the elements respectively mounted on first and second rotating shafts having axes lying in essentially the same plane, the first and second shafts being constructed and arranged so that the elements lie in planes disposed at predetermined angles relative to the operating plane and to each other;
c. means for adjusting the rotational position of one of the first and second cutting elements with respect to rotational position of the other, comprising
 1. an arbor mounted on one of said rotating shafts and constructed to receive said one cutting element, the arbor having first and second oppositely threaded portions;
 2. first ring member constructed to be threaded on the first threaded portion;
 3. a second ring member constructed to be threaded on the first threaded portion against the first ring member and arranged to be abutted by one face of said one cutting element;
 4. means for releasably connecting said one cutting element and the second ring member to prevent relative rotational movement therebetween;
 5. and a third ring constructed to be threaded on the second threaded portion and arranged to abut the opposite face of said one cutting element and maintain it in locking relation against the second ring member.

5. The apparatus as defined by claim 1, wherein the power means for synchronously rotating the cutting elements comprises:
motor means;
and transmission means having an input shaft and first and second output shafts rotatable at the same rotational velocity in response to rotation of the input shaft;
the motor means operatively connected to the input shaft and the first and second cutting elements mounted on the first and second output shafts, respectively.

6. The apparatus as defined by claim 4, and further comprising a plurality of set screws disposed in the arbor and arranged to abut the first ring member and thereby prevent its axial movement away from a second ring member.

7. The apparatus as defined by claim 4, wherein the means for releasably connecting said one cutting member and the second ring member comprises a plurality of transverse dowels extending from the second ring member through openings formed in said one cutting element.

8. The apparatus as defined by claim 7, and further comprising a set screw for each of the transverse dowels, the set screws disposed in the arbor and arranged to abut the respective dowels and thereby releasably retain them in predetermined positions.

* * * * *